(12) United States Patent
Lin et al.

(10) Patent No.: US 11,506,830 B2
(45) Date of Patent: Nov. 22, 2022

(54) BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Donglong Lin, Beijing (CN); Peng Wu, Beijing (CN); Zeyuan Tong, Beijing (CN); Wenyang Li, Beijing (CN); Fujian Ren, Beijing (CN); Dong Cui, Beijing (CN); Zhipeng Zhang, Beijing (CN); Bin Long, Beijing (CN); Dae Keun Yoon, Beijing (CN); Qing Ma, Beijing (CN); Rui Han, Beijing (CN); Pai Sun, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 666 days.

(21) Appl. No.: 16/338,799

(22) PCT Filed: Sep. 6, 2018

(86) PCT No.: PCT/CN2018/104383
§ 371 (c)(1),
(2) Date: Apr. 2, 2019

(87) PCT Pub. No.: WO2019/062513
PCT Pub. Date: Apr. 4, 2019

(65) Prior Publication Data
US 2021/0356647 A1 Nov. 18, 2021
US 2022/0317361 A9 Oct. 6, 2022

(30) Foreign Application Priority Data

Sep. 26, 2017 (CN) .......................... 201710879912.4

(51) Int. Cl.
*F21V 8/00* (2006.01)
*G02F 1/1335* (2006.01)
*G02F 1/13357* (2006.01)

(52) U.S. Cl.
CPC ......... *G02B 6/0056* (2013.01); *G02B 6/0055* (2013.01); *G02F 1/13362* (2013.01); *G02F 1/133528* (2013.01)

(58) Field of Classification Search
CPC ........... G02F 1/133528; G02F 1/13362; G02F 1/133524; G02B 6/0056; G02B 6/0055
See application file for complete search history.

(56) References Cited

U.S. PATENT DOCUMENTS

| 6,147,725 A | * | 11/2000 | Yuuki | .................. G02B 6/0036 349/61 |
| 10,816,871 B1 | * | 10/2020 | Nayyer | ..................... G02F 1/31 |
| 2007/0052882 A1 | * | 3/2007 | Hwang | ................ G02B 6/0056 349/62 |

FOREIGN PATENT DOCUMENTS

| CN | 101699152 A | 4/2010 |
| CN | 102454915 A | 5/2012 |

(Continued)

OTHER PUBLICATIONS

China First Office Action, Application No. 201710879912.4, dated Oct. 9, 2019, 18 pps.: with English translation.

(Continued)

*Primary Examiner* — Mariam Qureshi
(74) *Attorney, Agent, or Firm* — Armstrong Teasdale LLP

(57) ABSTRACT

A backlight module and a display device are provided. The backlight module includes a polarizing light guide plate (Continued)

configured to convert incident light into first polarized light and second polarized light, a polarization direction of the first polarized light being perpendicular to a polarization direction of the second polarized light.

10 Claims, 3 Drawing Sheets

(56) References Cited

FOREIGN PATENT DOCUMENTS

| | | |
|---|---|---|
| CN | 203054396 U | 7/2013 |
| CN | 103293650 A | 9/2013 |
| CN | 103411160 A | 11/2013 |
| CN | 103925523 A | 7/2014 |
| CN | 103995363 A | 8/2014 |
| CN | 104272371 A | 1/2015 |
| CN | 105572971 A | 5/2016 |
| CN | 105842923 A | 8/2016 |
| CN | 205643970 U | 10/2016 |
| CN | 106773299 A | 5/2017 |
| CN | 107505773 A | 12/2017 |
| JP | 09189907 A | 7/1997 |

OTHER PUBLICATIONS

PCT International Search Report, Application No. PCT/CN2018/104383, dated Dec. 7, 2018, 8 pages: with English translation.
PCT Written Opinion, Application No. PCT/CN2018/104383, dated Dec. 7, 2018, 5 pages.: with English translation of relevant part.

\* cited by examiner

ABSTRACT

BACKLIGHT MODULE AND DISPLAY DEVICE

CROSS REFERENCE TO RELATED APPLICATIONS

This patent application is a National Stage Entry of PCT/CN2018/104383 filed on Sep. 6, 2018, which claims the benefit and priority of Chinese Patent Application No. 201710879912.4 filed on Sep. 26, 2017, the disclosures of which are incorporated by reference herein in their entirety as part of the present application.

BACKGROUND

The present disclosure relates to the field of liquid crystal display, and in particular, to a backlight module and a display device.

Transparent display products are light, thin and easy to carry, low energy consumption, environmental protection, and energy saving, etc., and are thus favored by more and more people. A transparent display product may enable the user not only to see an image of an object displayed on a display screen, but also to see the real object behind the display screen through the display screen, thereby generating a new human-computer interaction experience.

BRIEF DESCRIPTION

An aspect of the present disclosure provides a backlight module. The backlight module includes a polarizing light guide plate configured to convert incident light into first polarized light and second polarized light. A polarization direction of the first polarized light is perpendicular to a polarization direction of the second polarized light.

According to some embodiments of the present disclosure, the first polarized light is generated by the reflection of the incident light within the polarizing light guide plate.

According to some embodiments of the present disclosure, the polarizing light guide plate includes a Glan prism.

According to some embodiments of the present disclosure, the Glan prism includes a first prism having a first inclined surface, a first bottom surface, and a first side surface arranged to be orthogonal to the first bottom surface, and the first side surface being a rectangular surface, and a second prism having a second inclined surface, a second bottom surface, and a second side surface arranged to be orthogonal to the second bottom surface, the second side surface being a rectangular surface. The first inclined surface of the first prism is attached to the second inclined surface of the second prism, and the first polarized light exits from the first bottom surface of the first prism after being reflected at the inclined surface.

According to some embodiments of the present disclosure, the backlight module further includes a light source adjacent to the first side surface of the first prism. A light emitting direction of the light source is perpendicular to the first side surface of the first prism.

According to some embodiments of the present disclosure, the backlight module further includes a first reflective sheet adjacent to the second side surface of the second prism and configured to reflect the second polarized light in a direction toward the light source.

According to some embodiments of the present disclosure, the light source further includes a second reflective sheet adjacent to the first side surface of the first prism and opposite to the first reflective sheet, the second reflective sheet being configured to reflect the second polarized light reflected by the first reflective sheet back to the polarizing light guide plate and to change a polarization state of the second polarized light.

According to some embodiments of the present disclosure, the light source includes a substrate and a light emitting device on the substrate. The second reflective sheet and the light emitting device are located on the same side of the substrate and not overlap in the direction parallel to the substrate.

Another aspect of the present disclosure provides a display device. According to an embodiment of the present disclosure, the display device includes a backlight module described above.

According to some embodiments of the present disclosure, the display device further includes a liquid crystal module arranged on the light exiting side of the backlight module.

According to some embodiments of the present disclosure, the display device further includes a polarizer arranged on a side of the liquid crystal module away from the backlight module. A light transmission direction of the polarizer is perpendicular to the polarization direction of the first polarized light.

According to some embodiments of the present disclosure, a light transmittance of the polarizing light guide plate is higher than a light transmittance of the polarizer.

According to some embodiments of the present disclosure, the display device is a transparent liquid crystal display device.

BRIEF DESCRIPTION OF THE DRAWINGS

The above and/or additional aspects and advantages of the present disclosure will become apparent and readily understood from the description of embodiments in conjunction with the following drawings, in which.

DETAILED DESCRIPTION

Figure 1:
FIG. 1 shows a schematic diagram of a backlight module according to an embodiment of the present disclosure.

Embodiments of the present disclosure are described in detail below, and examples of the embodiments are illustrated in the drawings, wherein the same or similar reference numerals are used to refer to the same or similar elements or elements having the same or similar functions. The embodiments described below with reference to the accompanying drawings are intended to be illustrative only, and are not to be construed as limiting.

It is known to those skilled in the art that a transparent display device should have both a display function and transparency. The inventors have found that existing transparent display products are mainly organic light emitting display devices (OLEDs). In the related art, a transparent display of a liquid crystal display device mostly adopts a four-color pixel design (i.e., RGBW technology). Specifically, the transparency of a color film substrate is designed with the RGBW technology, and the color film substrate is made as a transparent showcase to improve the light transmittance of the display substrate. However, the inventors have conducted intensive research and a large number of experiments and found that the liquid crystal display device improved by this technology does not have a true transparent display function due to the limitation of the backlight module. Therefore, further improvement is required for the transparent display of the liquid crystal display device.

In an aspect of the disclosure, a backlight module is provided. According to an embodiment of the present disclosure, referring to FIG. 1, the backlight module includes a polarizing light guide plate 100. The polarizing light guide plate 100 is configured to convert incident light into first polarized light and second polarized light. The polarization direction of the first polarized light is perpendicular to the polarization direction of the second polarized light. In some embodiments of the present disclosure, at least the first polarized light may exit from the light exiting surface of the polarizing light guide plate for illuminating pixels so as to be used for display. In the case that such a backlight module is applied to a display device, since the light exiting from the polarizing light guide plate is polarized, it is not necessary to provide an additional polarizer between the polarizing light guide plate and the display panel, so that the structure may be simplified and the luminance may be improved.

As previously mentioned, the first polarized light may exit from the backlight module. In order to increase the transparency of the backlight module, the transmittance of the polarizing light guide plate 100 to the first polarized light and to light having the same polarization direction as the first polarized light should be as high as possible, so that the loss of the first polarization in the polarizing light guide plate 100 is as low as possible. According to an embodiment of the present disclosure, the polarizing light guide plate 100 may be a transparent medium. Thus, the transparency of the backlight module may be increased, and thus the display device having the backlight module has higher transparency to better realize transparent display. In addition, light from an object below the backlight module may illuminate the structure above the backlight module (for example, the liquid crystal display panel) after transmitting through the polarizing light guide plate, and is observed by the user. Therefore, the backlight module provided by the embodiment of the present disclosure may also be used in a transparent display device.

In some embodiments of the present disclosure, the specific type of the polarizing light guide plate is not particularly limited, and those skilled in the art may design according to specific conditions. In an exemplary embodiment, the polarizing light guide plate 100 may include a Glan prism. The Glan prism may divide light incident therein into first polarized light and second polarized light which propagate in two different directions and the polarization directions of which are perpendicular, and therefore, the incident light may be polarized by the Glan prism. In addition, the Glan prism has a high transparency, so that the transparency of the backlight module may be improved.

The manner in which the Glan prism is constructed is not particularly limited, and those skilled in the art may design according to specific conditions. As an example, the Glan prism may be formed in any of the following manners: i) two prisms having different refractive indices are in direct contact, ii) two prisms are bonded by a colloid, or iii) an air layer is formed between two prisms. It will be understood by those skilled in the art that two prisms that are in direct contact or have an air layer therebetween may be fixed through other components in the backlight module.

According to some embodiments of the present disclosure, the first polarized light is generated by reflection (especially total reflection) of the incident light within the Glan prism. The specific manner of reflecting the first polarized light is not particularly limited, and may be selected by those skilled in the art according to specific conditions. According to an exemplary embodiment of the present disclosure, in the case where the Glan prism is formed by two prisms in direct contacting with each other, two prisms made of materials having different refractive indices may be used to constitute the Glan prism, and thus the first polarized light may be reflected at the contact surface. According to another exemplary embodiment of the present disclosure, in the case where the Glan prism is formed by bounding the two prisms by a colloid, the first polarized light may be reflected on the bonding surface, using the fact that the refractive index of the colloid is different from the refractive indices of the optical materials forming the two prisms. According to a further exemplary embodiment of the present disclosure, in the case where there is an air gap between the two prisms, the first polarized light may be reflected, in particular totally reflected, at the interface between one of the two prisms and the air gap, using the fact that the refractive index of the air is different from the refractive indices of the optical materials forming the two prisms.

Figure 2:
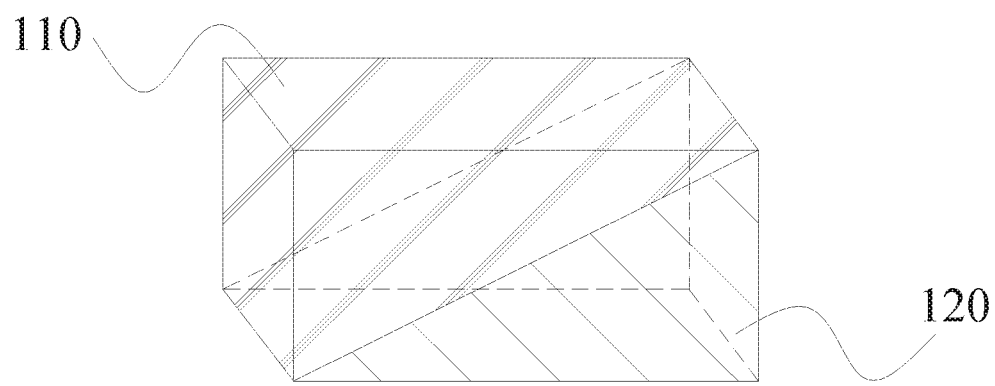
FIG. 2 shows a schematic diagram of an exemplary polarizing light guide plate according to an embodiment of the present disclosure.

According to some embodiments of the present disclosure, the Glan prism may include a first prism and a second prism, and the first prism and the second prism each have an inclined surface, and the Glan prism is constituted by bounding the inclined surfaces of the first prism and the second prism. According to an embodiment of the present disclosure, the optical materials forming the first prism and the second prism may be calcite. The first prism and the second prism may form a Glan prism by bonding the two inclined surfaces through a colloid. The shapes of the first prism, the second prism, and the Glan prism composed thereof are not particularly limited as long as they match the display panel in the display device, and those skilled in the art may design according to specific conditions. As an example, referring to FIG. 2, the Glan prism may include a first prism 110 and a second prism 120. The first prism 110 and the second prism 120 may be triangular prisms, and the Gran prism formed by bonding the inclined surfaces of the first prism 110 and the second prism 120 is a rectangular cuboid. Thus, using the Glan prism, the backlight module may be used for transparent display.

The principle that the polarizing light guide plate may be used for transparent display will be described in detail below according to specific embodiments of the present disclosure.

In the following embodiments, for convenience of description, a Glan prism formed by gluing two right-angled triangular prisms is taken as an example of the polarizing light guide plate for illustration. However, it is to be understood that the polarizing light guide plate in the embodiments of the present disclosure is not limited thereto, and the polarizing light guide plate may be formed in other manners, such as a polarization beam splitting prism, a Nicol prism, or the like.

In some embodiments of the present disclosure, in addition to achieving a function of uniform light, the polarizing light guide plate 100 may enable light without a specific polarization state to have a polarization state, thereby being usable for display of the display device without the need for arranging a polarizer between the backlight module and the display panel of the display device.

Figure 3:
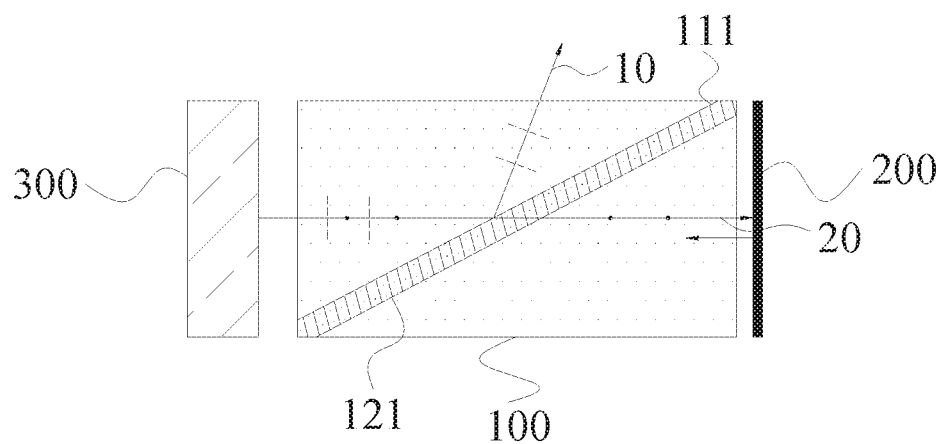
FIG. 3 is a schematic diagram showing the working principle of a backlight module according to an embodiment of the present disclosure.

It may be understood that a light source may be arranged on a side of the polarizing light guide plate in order to provide incident light to the polarizing light guide plate. Referring to FIG. 3, the polarizing light guide plate 100 may convert incident light emitted from the light source 300 into first polarized light 10 and second polarized light 20, and the polarization direction of the first polarized light 10 is perpendicular to the polarization direction of the second polarized light 20.

In an exemplary embodiment of the present disclosure, the polarizing light guide plate 100 may be formed of anisotropic crystals. As an example, the polarizing light guide plate 100 has an optical axis perpendicular to the plane of paper. The light incident on the polarizing light guide plate 100 is birefringent in the polarizing light guide plate 100 due to the birefringence effect, thereby forming the first polarized light 10 having the first polarization direction and the second polarized light 20 having the second polarization direction. The polarization direction of the first polarized light 10 (parallel to the plane of the paper, as shown by the short dashed line in the figure) is perpendicular to the optical axis, and the polarization direction of the second polarized light 20 (perpendicular to the plane of the drawing, as shown by the dot in the figure) is parallel to the optical axis.

In an exemplary embodiment of the present disclosure, the polarizing light guide plate 100 may be formed by bonding the inclined surfaces of two prisms through a colloid, and the colloid for bonding the two prisms has a refractive index smaller than the refractive indices of the prisms. The first polarized light 10 may satisfy the total reflection condition at the bonding surface of the inclined surfaces of the two prisms by configuring appropriate structural parameters of the two prisms of the polarizing light guide plate 100, such as an angle between the right-angled surface and the inclined surface of the prism, and thus total reflection occurs at the bonding surface. On the other hand, the second polarized light 20 does not satisfy the total reflection condition at the bonding surface of the polarizing light guide plate 100, and thus may be transmitted through the polarizing light guide plate 100. As a result, the polarizing light guide plate may divide the natural light incident therein into the first polarized light 10 and the second polarized light 20 having two different polarization directions. The first polarized light 10 may exit from the light exiting surface of the polarizing light guide plate for illuminating the pixels of the display device for display, and the second polarized light may be directly exit from the side surface of the polarizing light guide plate 100, as shown in FIG. 3.

According to the embodiment of the present disclosure, the polarizing light guide plate 100 may convert incident light into light having a polarization state and light having a polarization state may exit from the polarizing light guide plate 100, whereby a layer of polarizer may be reduced in the display device, and thus the transmittance of light may be improved. In addition, the polarizing light guide plate 100 may be formed of a transparent medium such as calcite, and therefore, the transmittance of light may be further improved.

As described above, the polarizing light guide plate may include a Glan prism capable of polarizing incident light emitted from the light source. The polarization of the incident light may be controlled by configuring the angle between the Glan prism and the light source. According to an embodiment of the present disclosure, the angle of the Glan prism is configured according to the light source. The magnitude of the angle is not particularly limited, and those skilled in the art may design according to specific conditions.

Figure 4:
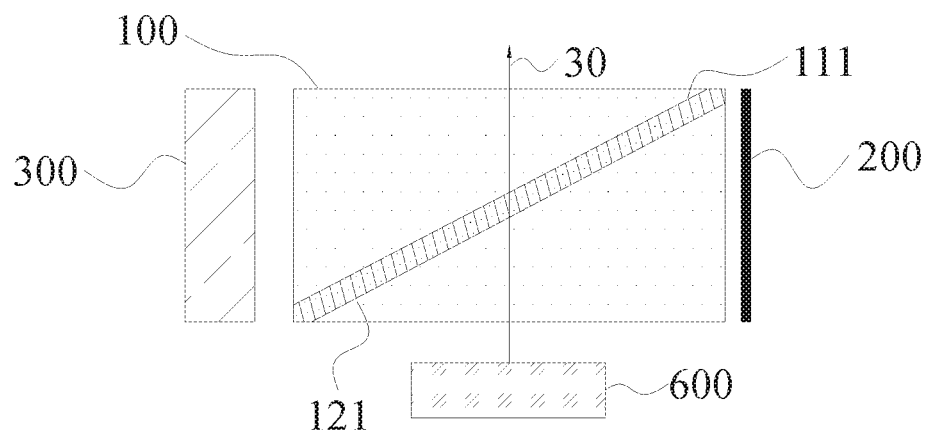
FIG. 4 is a schematic diagram showing the working principle of a backlight module according to another embodiment of the present disclosure.

In some embodiments of the present disclosure, the backlight module may also allow an object below the backlight module to be visible. As shown in FIG. 4, external light illuminates an object 600, and is refracted or reflected by the object, and then the light 30 reflected or refracted by the object 600 enters the Glan prism. According to an embodiment of the present disclosure, the angle of the Glan prism is configured according to the light source 300, and therefore, the Glan prism causes the light emitted by the light source 300 to be polarized, but the effect of polarizing the light 30 reflected or refracted by the object 600 is very weak. Therefore, most of the light 30 may be directly transmitted through and exit from the Glan prism. In this case, the object below the backlight module may be visible, and therefore, it may be used for transparent display.

Figure 5A:
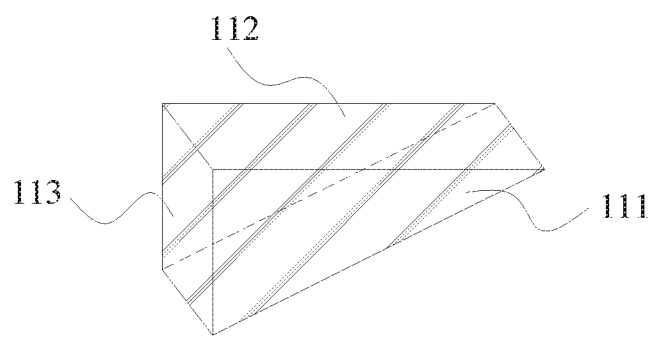
FIGS. 5A and 5B show schematic exploded diagrams of an exemplary polarizing light guide plate according to an embodiment of the present disclosure.
Figure 5B:
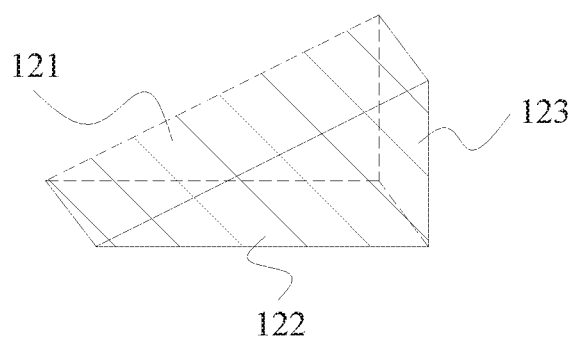

FIGS. 5A and 5B show schematic exploded diagrams of an exemplary polarizing light guide plate according to an embodiment of the present disclosure. Referring to FIGS. 5A and 5B, the polarizing light guide plate may be composed of a Glan prism including a first prism 110 and a second prism 120. The first prism 110 has a first inclined surface 111, the second prism 120 has a second inclined surface 121, and the first prism 110 and the second prism 120 are attached together by the first inclined surface 111 and the second inclined surface 121 to form a cuboid Glan prism. That is to say, the first inclined surface 111 and the second inclined surface 121 are on a diagonal plane of the cuboid. In this embodiment, the first polarized light is totally reflected at the attaching surface of the first inclined surface 111 and the second inclined surface 121. Thus, the polarization and reflection of light may be realized by the Glan prism.

According to an embodiment of the present disclosure, the first prism 110 may further have a first bottom surface 112 and a first side surface 113 orthogonal to the first bottom surface 112. The second prism 120 may further have a second bottom surface 122 and a second side surface 123 orthogonal to the second bottom surface 122. Both the first side surface 113 and the second side surface 123 are rectangular surfaces.

Figure 6:
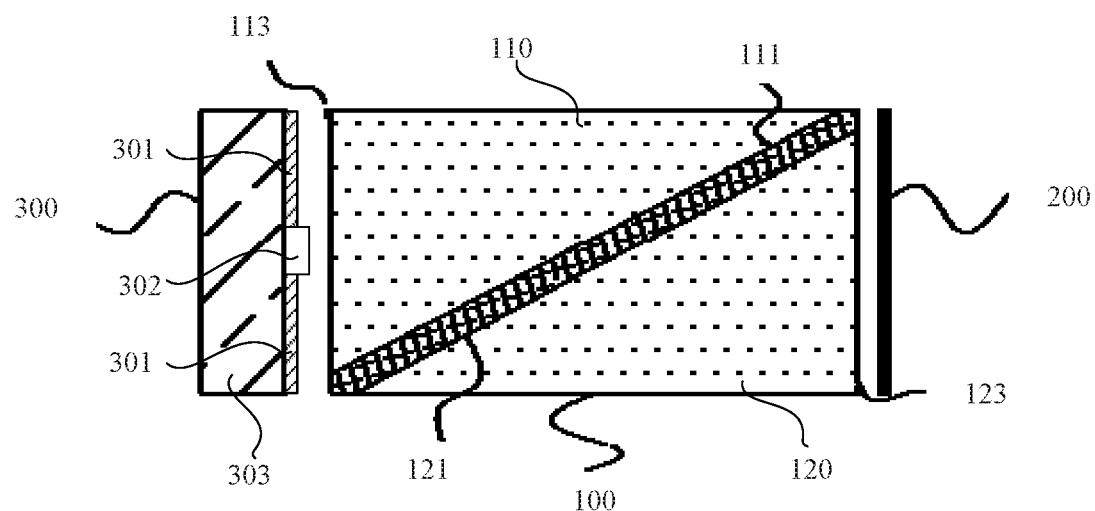
FIG. 6 shows a schematic structural diagram of a backlight module according to another embodiment of the present disclosure.

In some embodiments of the present disclosure, as shown in FIG. 6, the light source 300 may be adjacent to the first side surface 113 of the first prism 110. The light emitting direction of the light source 300 is perpendicular to the first side surface 113 of the first prism 110. In an exemplary embodiment, an optical element (not shown) such as a collimating element and a coupling element may be arranged between the light source 300 and the light incident surface (i.e., the first side surface 113) of the polarizing light guide plate 100 so as to enable incident light from the light source 300 to enter the polarizing light guide plate 100 in parallel.

According to an embodiment of the present disclosure, as shown in FIG. 6, the backlight module may further include a first reflective sheet 200 adjacent to the second side surface 123 of the second prism 120, and the first reflective sheet 200 is configured to reflect the second polarized light toward the direction of the light source. Specifically, the light source 300 is arranged toward the first side surface 113 of the Glan prism, and the first reflection sheet 200 is arranged facing the second side surface 123 of the Glan prism.

In an exemplary embodiment, the backlight module may further include a second reflective sheet 301 adjacent to the first side surface 113 of the first prism 110 and opposite to the first reflective sheet 200. With this configuration, the second polarized light exiting from the second side surface 123 of the second prism 120 may be reflected by the first reflective sheet 200 back to the polarizing light guide plate 100, and then pass through the polarizing light guide plate 100 to impinge on the second reflective sheet 301, thereafter be reflected back to the polarizing light guide plate 100 by the second reflective sheet. After the second polarized light is reflected by the second reflective sheet 301, its polarized state changes, and it is no longer the linearly polarized light, a polarization direction of which is perpendicular to the plane of the paper. As an example, the reflected light of the second polarized light may become one of the following: partially polarized light, circularly polarized light, elliptically polarized light, or unpolarized light, after sequentially reflected by the second reflective sheet 301. The reflected light again enters the polarization beam splitting prism and may still be divided into a first polarized light polarizing parallel to the plane of the paper and a second polarized light polarizing perpendicular to the plane of the paper. The first polarized light may be totally reflected at the attaching surface between the first prism 110 and the second prism 120 for display. The second polarized light may be transmitted through the polarizing light guide plate, impinging on the first reflective sheet 200 from the second side surface 123 of the second prism 120, and again reflected by the first reflective sheet 200 toward the second reflective sheet 301. Thus, the second polarized light may still be converted into light of other polarization states or unpolarized light. In this way, the second polarized light may be gradually converted into the first polarized light for display, so the utilization of light may be increased, and the luminance of the display panel may be improved.

In an exemplary embodiment, the second reflective sheet 301 may be formed of a metal reflector plated with such as silver or aluminum. Such a metal reflector may convert linearly polarized light into non-linearly polarized light (e.g., elliptically polarized light) by reflection.

In an embodiment of the present disclosure, the second reflective sheet 301 may be integrated onto the light source 300 as part of the light source 300 or may be a separate component independent of the light source 300.

In an exemplary embodiment, as shown in FIG. 6, the light source may include a light emitting device 302 such as an LED and a substrate 303 such as a flexible circuit board for mounting the light emitting device 302. In the illustrated embodiment, the second reflective sheet 301 is arranged at a position of the substrate 303 where there is no the light emitting device, so that the second reflective sheet does not block light emitted by the light emitting device.

In another aspect of the present disclosure, a display device is provided. According to an embodiment of the present disclosure, the display device may include a backlight module according to the present disclosure, such as a backlight module according to one or more embodiments disclosed in detail above. Thus for alternative embodiments of the display device, reference may be made to the embodiments of the backlight module. In general, the display device may achieve transparent display and has high luminance. According to an embodiment of the present disclosure, the display device may be a transparent liquid crystal display device.

Figure 7:
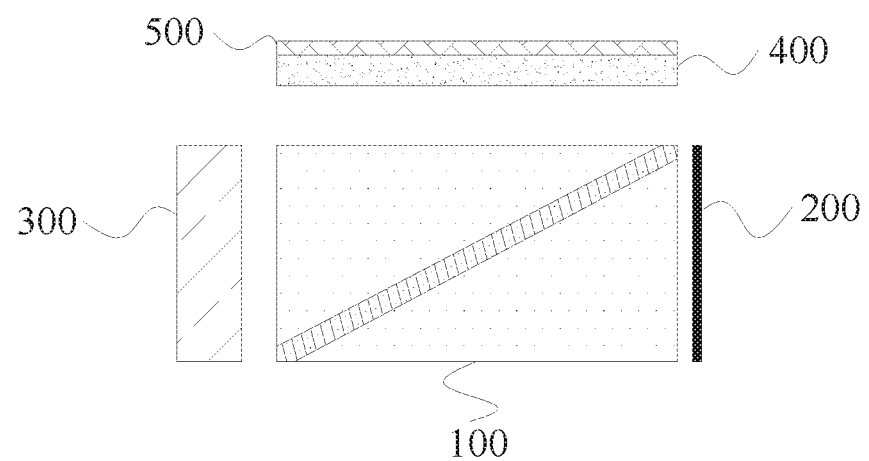
FIG. 7 shows a schematic diagram of an exemplary display device according to an embodiment of the present disclosure.

FIG. 7 shows a schematic diagram of an exemplary display device according to an embodiment of the present disclosure. Referring to FIG. 7, the display device may further include a liquid crystal module 400 and a polarizer 500 arranged on the side of the liquid crystal module 400 away from the backlight module in order to implement the function of the display device. The liquid crystal module 400 is arranged on the light exiting side of the backlight module, and no polarizer is arranged between the liquid crystal module 400 and the backlight module. According to the embodiment of the present disclosure, since the backlight module may not only provide backlighting, but also may realize polarization of light, one layer of polarizer may be omitted, and the blocking of the polarizer to light may be reduced, thereby improving the transmittance of light.

According to the embodiment of the present disclosure, the polarizer 500 is arranged on a side of the liquid crystal module 400 away from the backlight module, and the light transmission direction of the polarizer 500 cooperates with the polarization direction of the first polarized light, so that display may be realized. In an exemplary embodiment of the present disclosure, the light transmission direction of the polarizer 500 is perpendicular to the polarization direction of the first polarized light. According to the embodiment of the present disclosure, the first polarized light exiting from the backlight module illuminates the liquid crystal module 400, and since liquid crystals have optical activity, the polarization state of the first polarized light changes after passing through the liquid crystal layer. The polarization state of the light exiting from the liquid crystal layer may be controlled according to the magnitude of the voltage applied to both sides of liquid crystals, so that the intensity of the light exiting from the polarizer 500 may be controlled, thereby realizing bright and dark display. According to an embodiment of the present disclosure, in order to increase the display luminance of the display device, the light transmittance of the polarizing light guide plate and the polarizer may be designed such that the transmittance of the polarizing light guide plate to light is higher than that of the polarizer 500. Thus, the luminance of the display device may be further improved.

According to an embodiment of the present disclosure, the light reflected or refracted by the object and exiting from the backlight module also illuminates the liquid crystal module 400. Since the light is not completely linearly polarized light and has a component with polarization parallel to the light transmission direction of the polarizer after passing through the liquid crystal layer, it may pass through the polarizer 500. Thus, the object below the display device may be visible. Since the display device is provided with a structure capable of providing a display function, such as the liquid crystal module 400, the luminance of display thereof is greater than that of the display panel with the double-layer polarizer structure though smaller than that of directly passing through glass. Thus, in combination with the above two working principles, when the user sees an image in front of the screen, the user may see the object behind the display device through the image, thereby realizing transparent display. The principle of the backlight module for transparent display has been described in detail above and will not be described herein.

As described above, the backlight module in the display device adopts the polarizing light guide plate 100 according to embodiments of the present disclosure, thereby eliminating a layer of polarizer, thereby improving the transmittance of light. Thus, the display device may be used for transparent display.

In the description of the present disclosure, the orientation or positional relationship indicated by the term "upper", "lower" or the like is based on the orientation or positional relationship shown in the drawings, and is merely for the convenience of describing the present disclosure and does not require that the disclosure must be constructed and operated in a specific orientation, and is therefore not to be construed as limiting the disclosure.

In the description of the present specification, the description with reference to the terms "an embodiment", "another embodiment" or the like is intended to mean that the specific features, structures, materials, or characteristics described in conjunction with the embodiment are included in at least one embodiment of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, without contradicting each other, those skilled in the art may integrate and combine different embodiments or examples described in this specification and the characteristics of different embodiments or examples.

As used herein and in the appended claims, the singular form of a word includes the plural, and vice versa, unless the context clearly dictates otherwise. Thus, when the singular is mentioned, the plurals of the corresponding terms are usually included. In this specification, the terms "first" and "second" are used only for descriptive purposes and cannot be understood as suggesting or implying relative importance or implying the number of technical features indicated.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:

1. A backlight module comprising:
   a polarizing light guide plate configured to convert incident light into first polarized light and second polarized light, wherein a polarization direction of the first polarized light is perpendicular to a polarization direction of the second polarized light, and wherein the polarizing light guide plate comprises a Glan prism that comprises a first prism and a second prism;
   a light source located adjacent to a first side surface of the first prism, wherein a light emitting direction of the light source is perpendicular to the first side surface of the first prism;
   a first reflective sheet located adjacent to a second side surface of the second prism and configured to reflect the second polarized light, passing through the polarizing light guide plate, back to the polarizing light guide plate and toward the light source; and
   a second reflective sheet located adjacent to the first side surface of the first prism and facing the first reflective sheet, and configured to reflect the reflected second polarized light by the first reflective sheet back to the polarizing light guide plate and to change a polarization state of the second polarized light,
   wherein the light source comprises a substrate and a light emitting device on the substrate, and wherein the second reflective sheet and the light emitting device are located on a same side of the substrate and not overlapping in a direction parallel to the substrate.

2. The backlight module according to claim 1, wherein the first polarized light is generated by reflection of the incident light within the polarizing light guide plate.

3. The backlight module according to claim 1, wherein the first prism includes a first inclined surface, a first bottom surface, and the first side surface arranged to be orthogonal to the first bottom surface, wherein the first side surface is a rectangular surface;
   wherein the second prism includes a second inclined surface, a second bottom surface, and the second side surface arranged to be orthogonal to the second bottom surface, wherein the second side surface is a rectangular surface; and
   wherein the first inclined surface of the first prism is attached to the second inclined surface of the second prism, and wherein the first polarized light exits from the first bottom surface after being reflected at the first inclined surface.

4. A display device comprising the backlight module of claim 1.

5. The display device according to claim 4, further comprising:
   a liquid crystal module arranged on a light-exiting side of the backlight module.

6. The display device according to claim 5, further comprising:
   a polarizer arranged on a side of the liquid crystal module away from the backlight module, wherein a light transmission direction of the polarizer is perpendicular to the polarization direction of the first polarized light.

7. The display device according to claim 6, wherein a light transmittance of the polarizing light guide plate is higher than a light transmittance of the polarizer.

8. The display device according to claim 3, wherein the display device is a transparent liquid crystal display device.

9. The display device according to claim 8, wherein the first polarized light is generated by reflection of the incident light within the polarizing light guide plate.

10. The display device according to claim 4,
    wherein the first prism includes a first inclined surface, a first bottom surface, and the first side surface arranged to be orthogonal to the first bottom surface, wherein the first side surface is a rectangular surface; and
    wherein the second prism includes a second inclined surface, a second bottom surface, and the second side surface arranged to be orthogonal to the second bottom surface, wherein the second side surface is a rectangular surface;
    wherein the first inclined surface of the first prism is attached to the second inclined surface of the second prism, and wherein the first polarized light exits from the first bottom surface of the first prism after being reflected at the first inclined surface.

* * * * *